(12) United States Patent
Gilbert

(10) Patent No.: US 8,381,556 B2
(45) Date of Patent: Feb. 26, 2013

(54) COUPLING PLUG LOCK

(75) Inventor: Michael James Blair Gilbert, Wheelers Hill (AU)

(73) Assignee: ASSA ABLOY Australia Pty Ltd, Victoria (AU)

( * ) Notice: Subject to any disclaimer, the term of this patent is extended or adjusted under 35 U.S.C. 154(b) by 0 days.

(21) Appl. No.: 13/175,249

(22) Filed: Jul. 1, 2011

(65) Prior Publication Data

US 2012/0000259 A1    Jan. 5, 2012

(51) Int. Cl.
*F16K 35/00* (2006.01)
*G05G 5/00* (2006.01)

(52) U.S. Cl. .......................................... 70/175; 70/57.1

(58) Field of Classification Search ................ 70/31–34, 70/175–179, 229–232, 386; 285/80
See application file for complete search history.

(56) References Cited

U.S. PATENT DOCUMENTS

| 4,476,699 | A |   | 10/1984 | Dahlborg |
|---|---|---|---|---|
| 4,664,420 | A | * | 5/1987 | Demeri ........................... 285/86 |
| 5,033,280 | A |   | 7/1991 | Johnson |
| 5,066,049 | A | * | 11/1991 | Staples ........................... 285/80 |
| 6,634,195 | B2 | * | 10/2003 | Lenz et al. ...................... 70/178 |
| 6,854,302 | B2 | * | 2/2005 | Zapushek et al. ................ 70/34 |
| 2002/0093194 | A1 |   | 7/2002 | Lacroix et al. |

FOREIGN PATENT DOCUMENTS

| AU | 2007209791 A1 | 8/2007 |
|---|---|---|
| GB | 2089918 A | 6/1982 |
| GB | 2277134 A | 10/1994 |

* cited by examiner

*Primary Examiner* — Suzanne Barrett
*Assistant Examiner* — Richard G Davis
(74) *Attorney, Agent, or Firm* — Stetina Brunda Garred & Brucker

(57) ABSTRACT

This invention relates to a coupling plug lock assembly 2 for controlling access to a coupling plug 1. The lock assembly 2 includes a housing 9 for receiving the plug 1, an actuator 10 moveable between a latch position and a release position, and a lock means 17 for locking the actuator in the latch position. The lock assembly 2 is intended for obstructing access to the plug 1 for discouraging unauthorized access to the plug 1.

25 Claims, 5 Drawing Sheets

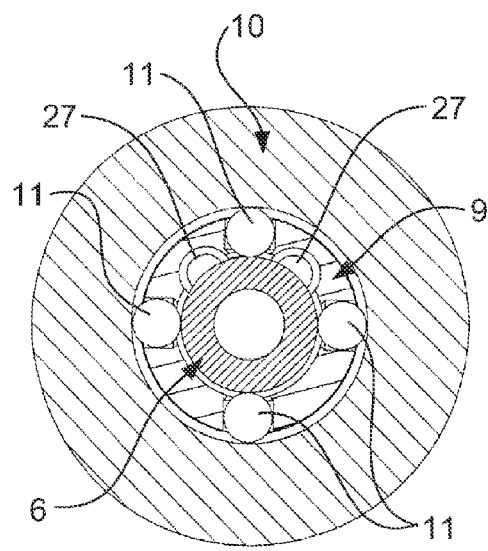
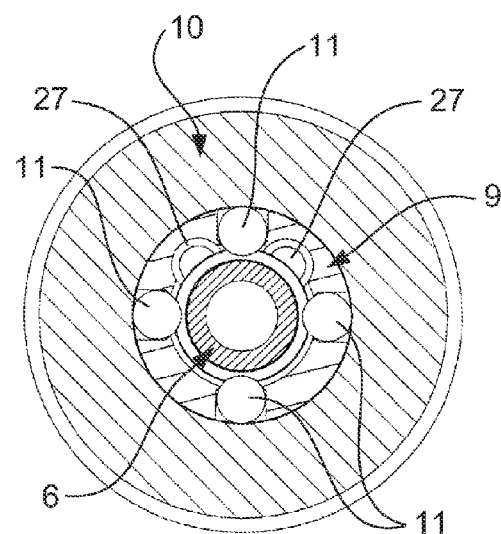
FIG 3
FIG 5
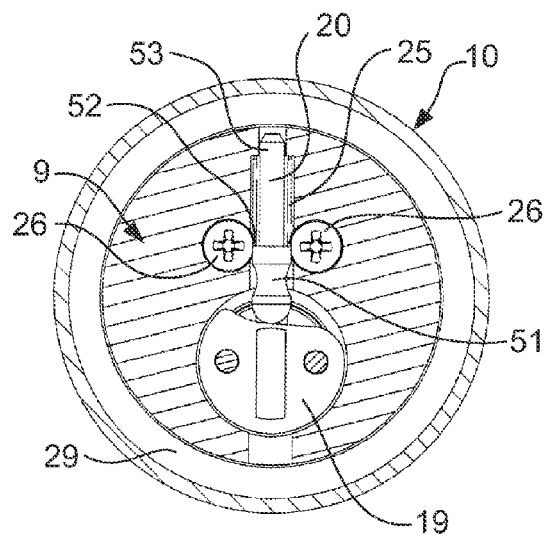
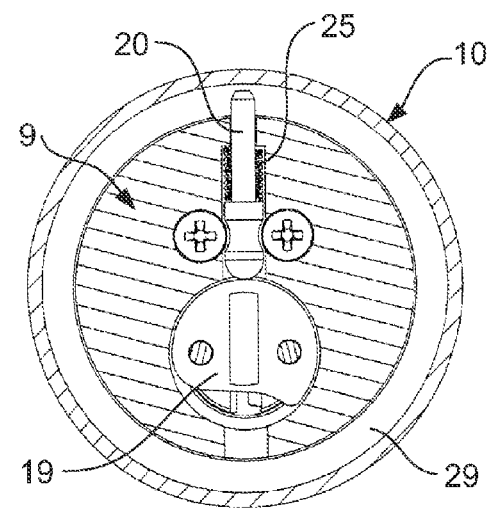
FIG 6
FIG 7

COUPLING PLUG LOCK

CROSS-REFERENCE TO RELATED APPLICATIONS

The present application claims priority to Australian Patent Application No. 2010902960 filed on Jul. 2, 2010.

STATEMENT RE: FEDERALLY SPONSORED RESEARCH/DEVELOPMENT

Not Applicable

BACKGROUND OF THE INVENTION

1. Technical Field of the Invention

This invention relates to a lock assembly for locking onto a coupling plug so as to control access to the plug. A coupling plug and socket is often used on hydraulic or pneumatic lines so as to provide a disconnection point. It will be convenient to hereinafter describe the invention with reference to this particular application. It is to be appreciated however that the invention has other applications.

2. Description of the Related Art

The coupling plugs of the foregoing kind tend to have a cylindrical shaft with a recess formed in the shaft which receives a detent associated with the socket of the coupling when the socket is coupled to the plug. The socket is often located at the end of a hydraulic or pneumatic line and the plug is mounted to an object that requires pressurised fluid to operate. Examples of the types of objects includes power tools to truck trailers. Accordingly using a lock assembly to obstruct access to the plug can render the object inoperable. This can stop or at least discourage unauthorised persons removing or operating the object.

SUMMARY OF THE INVENTION

According to this invention there is provided a lock assembly for locking onto a coupling plug which has a shaft extending in an axial direction, the shaft having a recess formed in a surface of the shaft, the recess extending substantially perpendicular to the axis of the shaft, the lock assembly including;

a housing defining a space within which the shaft is locatable, the housing houses at least one detent which is movable in a direction substantially perpendicular to the axial direction between an active position and an inactive position, the at least one detent is located in the recess in the shaft when in the active position an actuator which is movable in the axial direction relative to the housing between a latch position and a release position, whereby said at least one detent is restrained from moving from the active position when the actuator is in the latch position, locking means housed by the housing that retains the actuator in the latched position when the locking means is in a locked condition.

It is preferred that the lock means includes a cylinder lock fastened to the housing so as to allow the cylinder lock to be interchangeable. It is further preferred that the cylinder lock is fastened to the housing by at least one fastener, whereby access to the fastener for its removal is obstructed when the housing is located on the shaft. It is still further preferred that the lock means includes a cam that is rotatable about an axis that extends in the axial direction when adjusting the condition of the locking means relative to the locked condition. The cam preferably acts on a follower that is movable in a radial direction from the axis of rotation of the cam which is substantially perpendicular to the axial direction, the follower being movable relative to an extended position in which position corresponds to the locking means being in a locked condition.

It is preferred that the lock mean includes a biasing means for biasing the follower away from the extended position. It is further preferred that the follower is a pin that extends across an interface between the actuator and the housing when the locking means is in a locked condition and retracts within the housing when the locking means is adjusted from the locked condition.

Alternatively the rotational axis of the cam is located in a plane, and the cam acts on a follower that is movable in a direction substantially perpendicular to the plane when the locking means adjusts relative to the locked condition. In this preferred arrangement the follower includes at least one sphere that extends across an interface between the actuator and the housing and locates within a recess formed in the actuator when the locking means is in the locked condition, and is retained in the recess to prevent the actuator moving from the latch position while the locking means remains in the locked condition. The at least one sphere preferably includes at least two spheres, the spheres being movable in opposing directions when the locking means is adjusted relative to the locked condition. The recess is preferably shaped to allow the actuator to rotate relative to the housing while the actuator is in the latch position and the locking means is in the locked condition. The recess is also preferably shaped relative to the sphere so as to urge the sphere out of the recess when the actuator is moved from the latch position towards the release position. The recess is preferably an annular recess formed in an inner surface of the actuator. The housing includes a bore to accommodate each sphere, the bore extending from the cam to an outer surface of the housing. The follower preferably includes at least one intermediate member acting between the cam and the at least one sphere. The intermediate member is preferably spherically shaped.

It is preferred that the lock assembly include a biasing means acting on the actuator for urging it towards the latch position. It is also preferred that the lock assembly include an abutment which interacts with the actuator to limit axial movement of the actuator in the latch position. It is further preferred that the abutment is detachably located on the housing.

It is preferred that the actuator includes an inner surface a first portion of which cooperates with the at least one detent when the actuator is in the latch position to restrain the detent from moving from the active position. It is further preferred that the first portion of the inner surface is substantially annular and extends substantially parallel to the axial direction. It is still further preferred that the inner surface includes a second portion extending from the first portion that is substantially frusto-conical with the conical axis being coaxial with the axial direction, the second portion cooperates with the at least one detent when the actuator is moving from the release position to the latching position to urge the at least one detent towards the active position.

It is preferred that the housing includes an aperture for each detent which extends from the space in a direction substantially perpendicular to the axial direction, each detent being movable within its aperture to move between the active position and the inactive position. It is further preferred that the detent is shaped relative to the size of the aperture so to protrude from the aperture when in the active or inactive positions respectively. It is still further preferred that each detent is substantially spherical and the aperture extends in a radial direction for a distance less than the diameter of the spherical detent.

It is preferred that the plug includes an attachment portion from which the shaft extends for attaching the plug to an object, wherein the actuator is configured to interact with the attachment portion that when in the locked position the plug is prevented from being detached from the object.

A reference herein to a patent document or other matter which is given as prior art is not to be taken as an admission that that document or matter was, in Australia, known or that the information it contains was part of the common general knowledge as at the priority date of any of the claims.

It would be convenient to hereinafter describe an example of the invention with reference to the attached drawings. It is to be appreciated however that the drawings are merely illustrative of how the invention might be put into effect, so that the specific form and arrangement of the various features as shown is not to be understood as limiting on the invention.

BRIEF DESCRIPTION OF THE DRAWINGS

FIG. 3 is a cross-sectional view through III-III of FIG. 2.

FIG. 5 is a cross sectional view through V-V from FIG. 4.

FIG. 6 is a cross sectional view through VI-VI from FIG. 4 with the locking means in an unlocked condition.

FIG. 7 is a cross sectional view through VII-VII from FIG. 4 with the locking means in a locked condition.

DETAILED DESCRIPTION OF THE INVENTION

Figure 1:
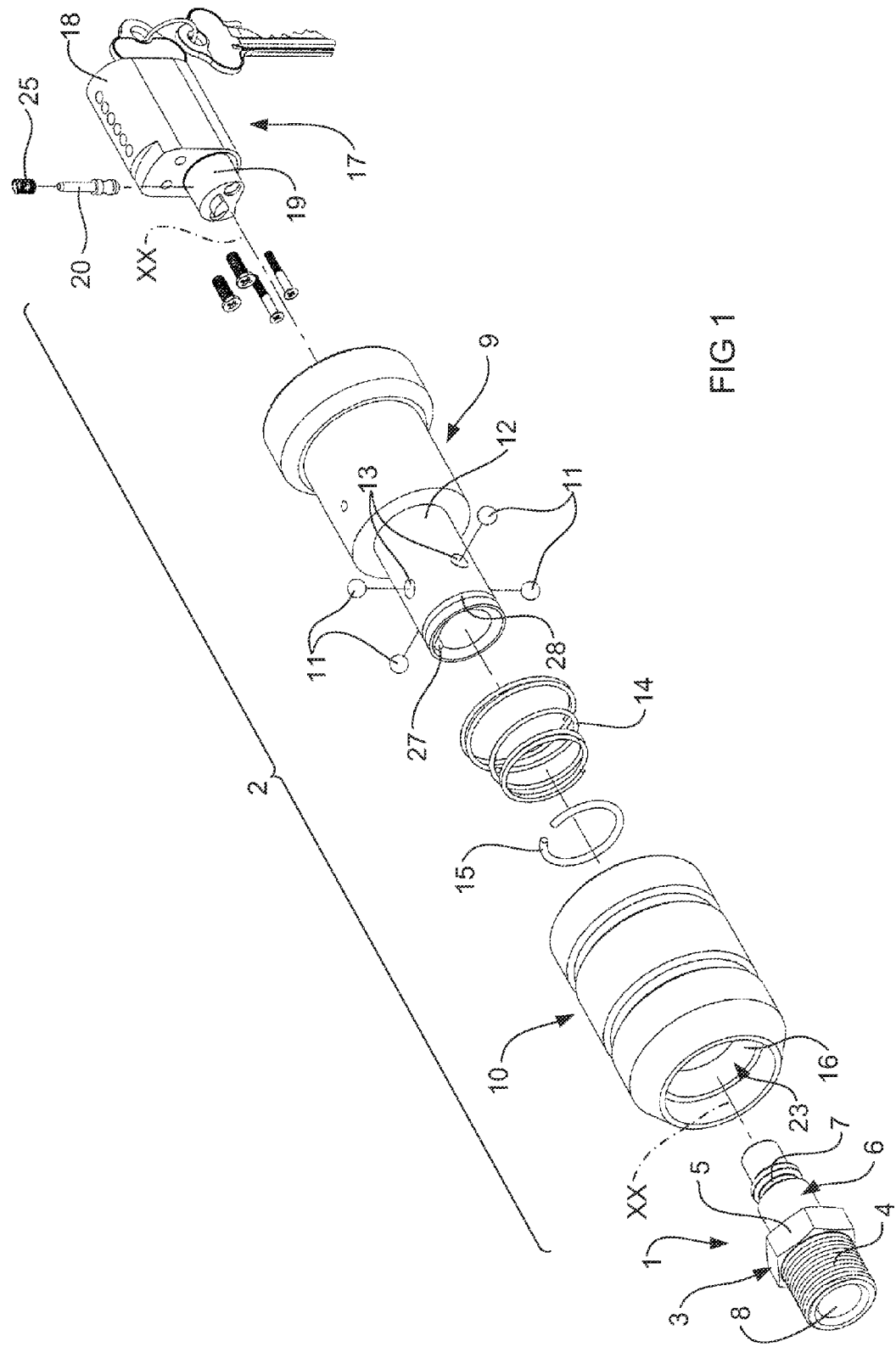
FIG. 1 is an isometric view of a coupling plug and a lock assembly illustrated in an exploded form and in a detached position.

Referring firstly to FIG. 1 which illustrates a coupling plug 1 and a lock assembly 2 for use in controlling access to the coupling plug 1. The coupling plug 1 includes an attachment portion 3 for connection to an object (not shown) and has a threaded cylinder 4 with an integrally formed nut 5. The threaded cylinder 4 is for location in a threaded bore in the object and can be rotated by a spanner, or the like, acting on the nut 5 to tighten the connection to the object.

A shaft 6 extends from the attachment portion 3 with an annular recess 7 formed in the shaft 6. The shaft 6 is designed to connect to a socket component (not shown) of a connection in a hydraulic line. The plug 1 has a bore 8 so as to allow hydraulic fluid to pass along the line through the socket and plug 1 to the object. It ought to be appreciated that by obstructing the end of the shaft 6 this would stop an unauthorised person from connecting to the object.

The lock assembly 2 illustrated in FIG. 1 includes a housing 9 with an actuator 10 in the form of a sleeve 10 over the housing 9. The actuator 10 is moveable along the axis XX between a latch position and a release position. The lock assembly 2 according to the invention includes at least one detent 11, and in the embodiment illustrated there are four detents 11 spaced radially around a shaft 12 of the housing 9. The number of detents 11 may vary to that illustrated. The detents 11 are preferably in the form of small spheres 11 that locate in radially extending apertures formed in the shaft 12 of the housing 9. The spheres 11 are moveable within each aperture between an active position and an inactive position. Each aperture 13 may be shaped so as to capture each spheres 11 within the aperture 13, by way of a constriction at the radial extremity of each aperture 13 by constricting to of a diameter less than the diameter of the sphere 11 however this is not essential.

A biasing means 14 acts between the actuator 10 and the housing 9 to urge the actuator 10 to adopt the latch position. The biasing means 14 in the embodiment illustrated in FIG. 1 is in the form of a conical spring 14, however this form of biasing means is not essential. An abutment 15 that interacts with the actuator 10 is located at a distal end of the shaft 12 of the housing 9 for limiting movement of the actuator 10 in the axial direction away from the housing 9. The preferred form of abutment 15 illustrated is in the form of a split ring 15 that locates in an annular groove 28 formed in the outer surface at the distal end of the shaft 12 of the housing 9. This abutment 15 acts on an inner surface 16 of the actuator 10 so that the two engage when limiting movement of the actuator 10. The abutment 15 is detachably located on the shaft 12 to enable the actuator 10 to be removed from the housing 9 if necessary for issues such as maintenance.

The locking assembly according to the invention includes a lock means 17 which in this embodiment illustrated in FIG. 1 includes a cylinder lock 18 housed at a proximal end of the housing 9. The form of cylinder lock 18 illustrated is a pin tumbler cylinder lock, however this may vary. The lock means also includes a cam 19 attached to the barrel of the cylinder lock 18 which interacts with a follower 20 in a manner that will be discussed with greater detail to reference to later illustrations.

Figure 2:
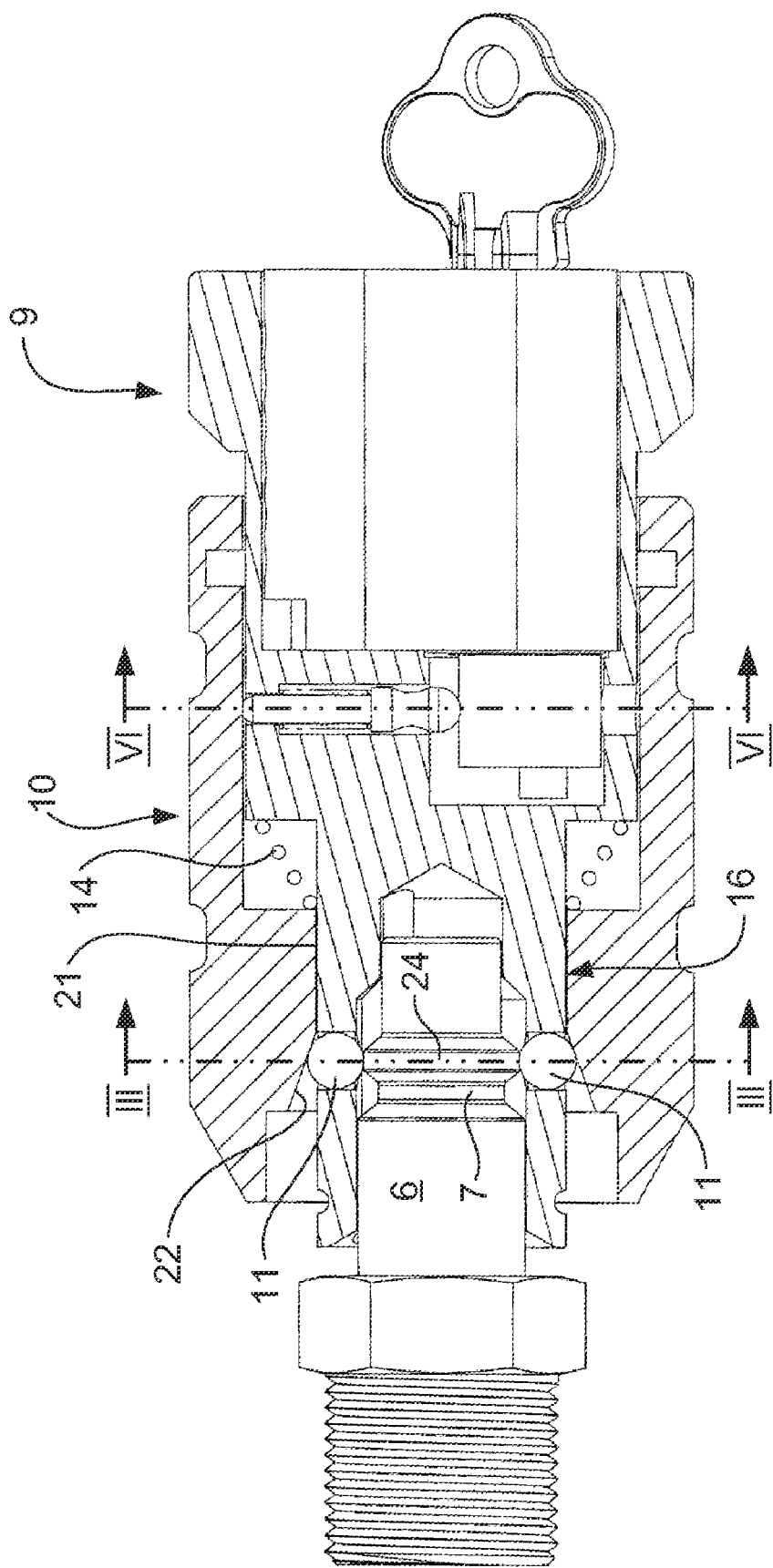
FIG. 2 is a long sectional view with the actuator in a release position, and the detents in an inactive position.

Referring now to FIG. 2 which illustrates the actuator 10 retracted towards the proximal end of the housing 9 against the action of the conical spring 14. The inner surface 16 of the actuator 10, which for ease of explanation, is defined as having a first 21 and second portion 22. FIG. 2 illustrates the spheres 11 adjacent the second portion 22 of the inner surface 16. The detent 11 is considered to be in an inactive position when it is in this radial extremity. The radial position of the detents 11 can be appreciated by referring to FIG. 3. When the detent 11 is in the inactive position, the shaft 6 of the plug 1 can be located in the space 23 (see FIG. 1) in the housing 9 by moving the housing 9 over the shaft 6. The detents 11 are moveable radially out as they move over the ridge 24 (see FIG. 2) adjacent the recess 7 formed in the shaft 6.

Figure 4:
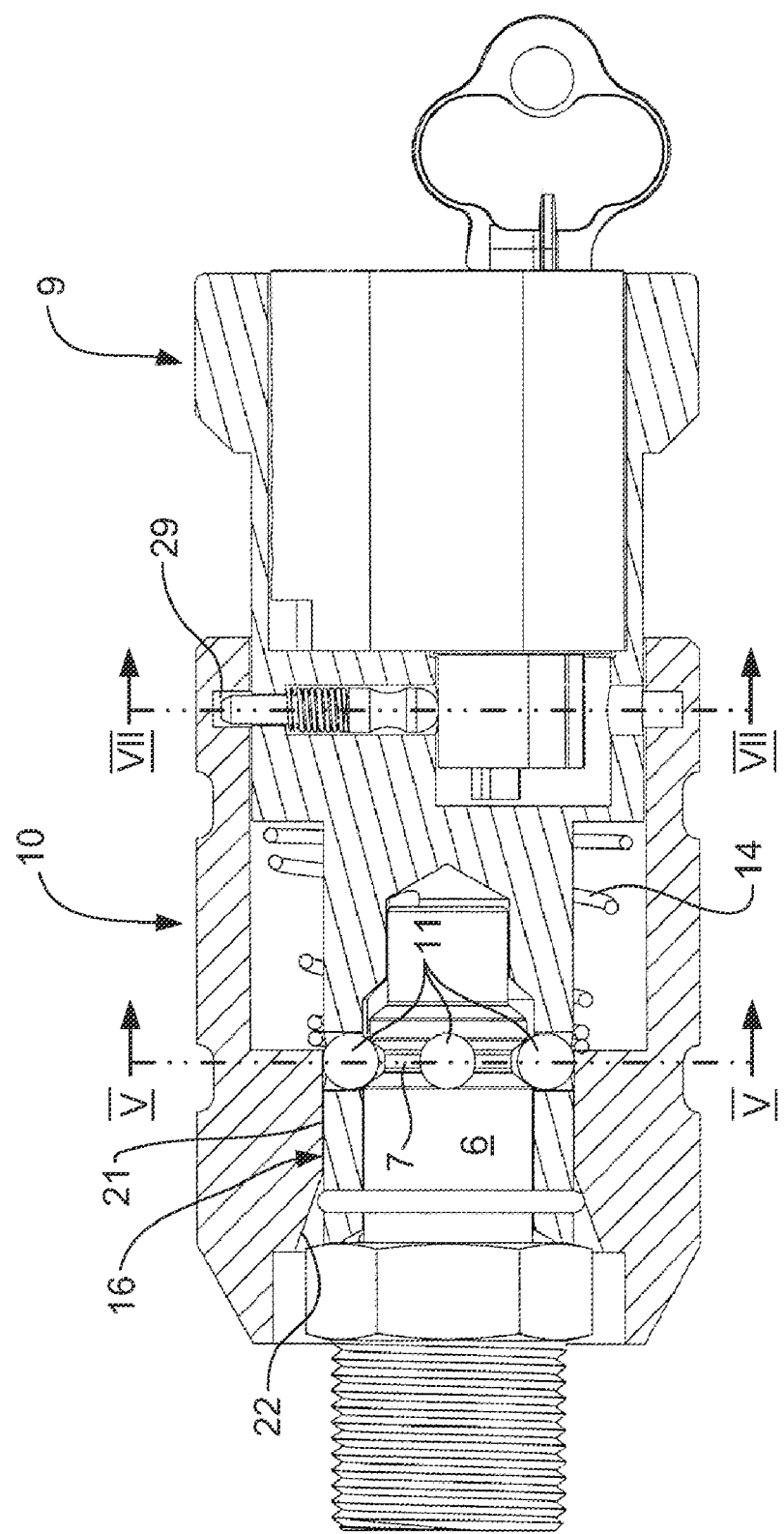
FIG. 4 is a long sectional view with the actuator in a latch position and the detents in an active position.

Referring now to FIG. 4 which illustrates the housing 9 moved to align the detents 11 with the recess 7 formed in the shaft 6, and it should be noted that the detents 11 have been moved radially in to locate partially within the recess 7. This movement is as a result of the actuator 10 moving under the force of the conical spring 14, so that the inner surface 16 of the actuator 10 slides over the detents 11. In particular, second portion 21 of the inner surface 16 slides relative to the detent 11 so as to locate the first portion 22 of the inner surface 16 over the detent 11. The first portion 21 has a smaller diameter than the second portion 22 at its widest point so that the detent is retained in the recess 7 formed in the shaft 6. The detent is considered to be in an active position when located in the recess 7. Furthermore, the actuator 10 is considered to be in a latch position while it is restraining the detents 11 in the recess 7 formed in the shaft 6. It can be appreciated from FIG. 5 that the detents 11 have been moved radially inwards into the active position and are retained in this position by the first portion 21 of the inner surface 16 of the actuator 10. It also ought to be appreciated that the housing 9 cannot be moved in the axial direction whilst the detents 11 and the actuator 10 are in this latching position.

Referring now to FIG. 6 which illustrates the cam 19 of the lock means 17 in a rotational position whereby the follower 20, under the influence of a spring 25, is in a radially retracted position. When the follower 17 is in this position the actuator 10 is moveable in the axial direction between the latch position (FIG. 4) and the release position (FIG. 2). When the actuator 10 is in a latch position, the follower 20 can be moved radially by rotation of the cam 19 about an axis which is substantially parallel to the axis XX so that the follower 20 extends across an interface between the housing 9 and the actuator 10 as illustrated in FIG. 7. The locking means 17 is considered to be in a locked condition when the follower 20 locates in an annular recess 29 (see FIG. 4) of the actuator 10, as the actuator 10 is prevented from being moved in the axial direction. This in turn restrains the detents 11 in the active position, locking the lock assembly 2 onto the plug 1.

It can be a appreciated from FIG. 6 that the follower 20 is in the form of a pin. The pin includes a head 51 with a shoulder 52 against which the spring 25 acts. The spring 25 surrounds a body 53 of the pin 20. The head 51 and body 53 each have a rounded or bevelled end to facilitate interaction with the cam 9 and recess 29 respectively.

The cylinder lock 18 is detachably fastened to the housing 9 by way of fasteners 26 connected to a rear of the cylinder lock 18. The fasteners 26 are accessible through the distal end of the housing 9, and it can be appreciated from FIG. 1, 3 or 5 that the housing 9 is formed with a pair of flutes 27 to provide a direct line of access to the screw fasteners 26. It ought to be appreciated that the cylinder lock 18 can be detached from the housing 9 without requiring removal of the actuator 10 from the housing 9.

Figure 8:
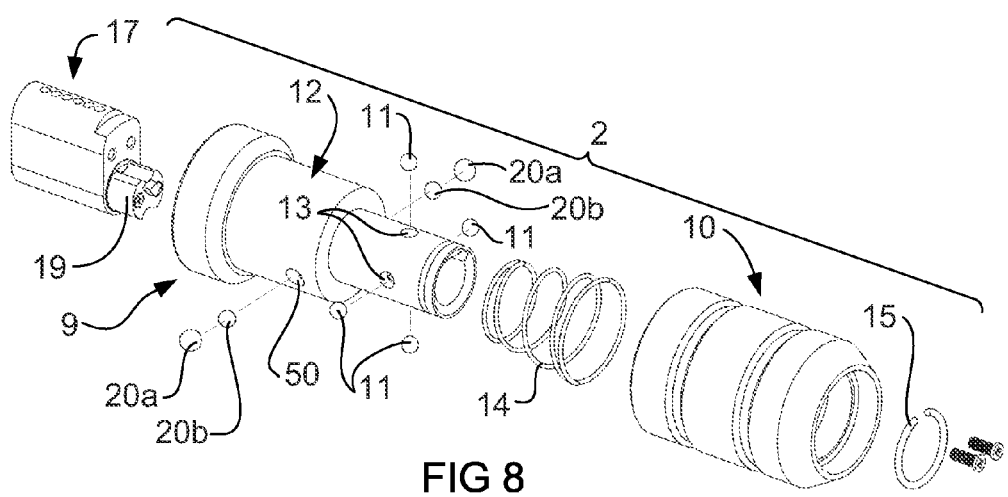
FIG. 8 is an isometric view of another embodiment of the lock assembly illustrated in an exploded form.
Figure 9:
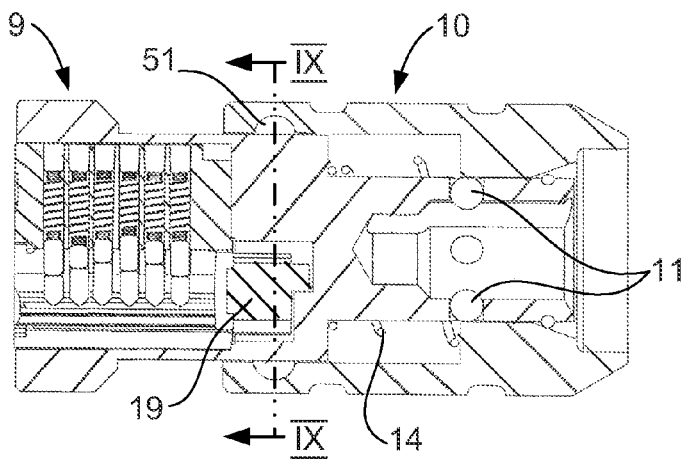
FIG. 9 is a cross sectional view of the lock assembly from FIG. 8 in the assembled form.

FIGS. 8 to 11 illustrate another form of the lock assembly 2 according to the invention and like reference numerals have been used to refer to the like features from FIGS. 1 to 7. Accordingly, FIG. 8 illustrates a lock assembly 2 including a lock means 17, a housing 9 and an actuator 10. The conical spring 14 acts between the actuator 10 and the housing 9 to urge the actuator 10 towards the release position. The abutment 15 is in the form of a circlip which limits movement of the actuator 10 away from the housing 9 under the influence of the spring 14. The housing 9 includes a plurality of apertures 13 spaced around the shaft 12, each aperture being shaped to accommodate the spherical detent 11. The actuator 10 interacts with the detents 11 to retain the detents in engagement with a shaft of the coupling plug 1 (not shown in FIGS. 8) in the same manner as was previously described with reference to FIGS. 1 to 7.

Figure 10:
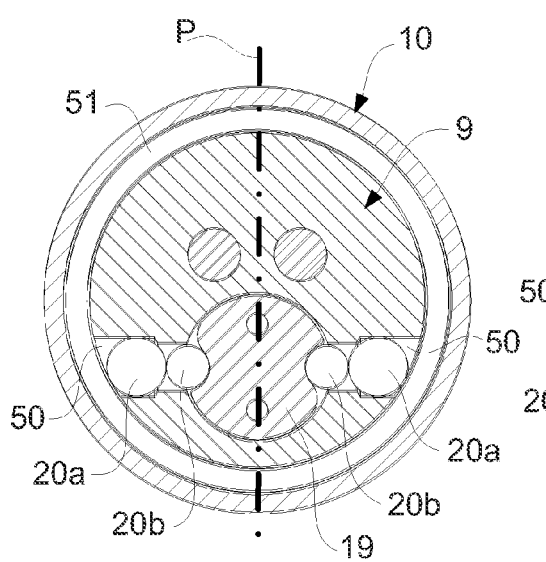
FIG. 10 is a cross sectional view of the lock assembly from FIG. 9 through IX-IX with the locking means in an unlocked condition.
Figure 11:
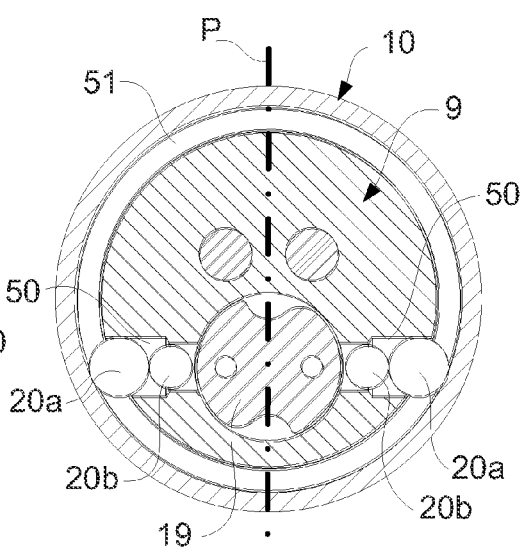
FIG. 11 is a cross sectional view of the lock assembly from FIG. 9 through IX-IX with the locking means in a locked condition.

The embodiment illustrated in FIGS. 8 to 11 differs from the previous embodiment in an alteration to the locking means 17. The locking means 17 includes a cam 19 which interacts with spherical followers 20 located within apertures 50 (only one is visible in FIG. 8) formed in the shaft 12 of the housing 9. When the locking means 17 is in the locked condition the spheres 20 extend across an interface between the housing 9 and the actuator 10. The spheres 20a locate within an annular recess 51 formed in the inner surface of the actuator 10 as can be appreciated by reference to FIGS. 9 and 11. The cam 19 is rotatable about an axis which is located within a plane _P and it can be appreciated by comparing FIGS. 10 and 11 that the spherical followers 20 move in a direction substantially perpendicular to that plane P on rotation of the cam 19. Whilst FIGS. 10 and 11 illustrate spheres 20 moving either side of the plane P, it ought to be appreciated that the same function could be achieved with a single sphere 20 one side of the plane P.

The follower 20 illustrated in FIGS. 10 and 11 includes two larger spheres 20a each being spaced from the cam 19 by an intermediate member 20b. It is not essential that the follower be in this form with a plurality of larger spheres 20a and smaller intermediate members 20b. However housing the intermediate members 20b in the form of spheres also allows them to roll across the surface of the cam 19. The shape of the spheres 20a interacts with the annular recess 51 in a way so that movement of the actuator 10 away from the latching position causes the spheres 20a to retract within the apertures 50 formed in the housing 9. In this way the follower 20 does not require a biasing means as was required by the follower 20 of the earlier embodiment illustrated in FIG. 1.

It ought to be appreciated from the foregoing description that the lock assembly according to the invention as hereinbefore described provides a relatively simple and convenient means for blocking access to an hydraulic plug. Locating the locking means within the housing, as opposed to having a padlock external to the housing, provides a cleaner and more compact solution. Furthermore, utilising a cylinder lock that is detachable from the housing enables convenient adjustment of the keying configuration for the lock assembly.

Various alterations, modifications and/or additions may be introduced into the construction arrangement of parts previously described without departing from the spirit or ambit of the invention.

What is claimed is:

1. A lock assembly for locking onto a coupling plug which has a shaft extending in an axial direction, the shall having a recess formed in a surface of the shaft, the recess extending substantially perpendicular to the axial direction of the shaft, the lock assembly including;

a housing defining a space within which the shaft is locatable, the housing houses at least one detent which is movable in a direction substantially perpendicular to the axial direction between an active position and an inactive position, the at least one detent is located in the recess in the shaft when in the active position an actuator which is movable in the axial direction relative to the housing between a latch position and a release position, whereby said at least one detent is restrained from moving from the active position when the actuator is in the latch position, locking means housed by the housing that retains the actuator in the latched position when the locking means is in a locked condition, said locking means further comprising a cam that is rotatable about a cam axis when adjusting the condition of the locking means relative to the locked condition, and the cam axis extends in the axial direction.

2. A lock assembly according to claim 1 wherein the locking means includes a cylinder lock fastened to the housing so as to allow the cylinder lock to be interchangeable.

3. A lock assembly according to claim 2 wherein the cylinder lock is fastened to the housing by at least one fastener, whereby access to the fastener for its removal is obstructed when the housing is located on the shaft.

4. A lock assembly according to claim 1 wherein the cam acts on a follower that is movable in a radial direction from the cam axis which is substantially perpendicular to the axial direction, the follower being movable relative to an extended position in which position correspond to the locking means being in a locked condition.

5. A lock assembly according to claim 4 wherein the locking means includes a biasing means for biasing the follower away from the extended position.

6. A lock assembly according to claim 5 wherein the follower is a pin that extends across an interface between the actuator and the housing when the locking means is in a locked condition and retracts within the housing when the locking means is adjusted from the locked condition.

7. A lock assembly according to claim 1 wherein the cam axis is located in a plane, the cam acts on a follower that is movable in a direction substantially perpendicular to the plane when the locking means adjusts relative to the locked condition.

8. A lock assembly according to claim 7 wherein the follower includes at least one sphere that extends across an interface between the actuator and the housing and locates within a recess formed in the actuator when the locking means is in the locked condition, and is retained in the recess to prevent the actuator moving from the latch position while the locking means remains in the locked condition.

9. A lock assembly according to claim 8 wherein the at least one sphere includes at least two spheres, the spheres being movable in opposing directions when the locking means is adjusted relative to the locked condition.

10. A lock assembly according to claim 9 wherein the recess is shaped to allow the actuator to rotate relative to the housing while the actuator is in the latch position and the locking means is in the locked condition.

11. A lock assembly according to claims 10 wherein the recess is shaped relative to the sphere so as to urge the sphere out of the recess when the actuator is moved from the latch position towards the release position.

12. A lock assembly according to claim 8 wherein the recess is an annular recess formed in an inner surface of the actuator.

13. A lock assembly according to claim 8 wherein the housing includes a bore to accommodate each sphere, the bore extending from the cam to an outer surface of the housing.

14. A lock assembly according to claim 8 wherein the follower includes at least one intermediate member acting between the cam and the at least one sphere.

15. A lock assembly according to claim 14 wherein the intermediate member is spherically shaped.

16. A lock assembly according to claim 1 including a biasing means acting on the actuator for urging it towards the latch position.

17. A lock assembly according to claim 1 including an abutment which interacts with the actuator to limit axial movement of the actuator in the latch position.

18. A lock assembly according to claim 17 wherein the abutment is detachably located on the housing.

19. A lock assembly according to claim 1 wherein the actuator includes an inner surface, a first portion of which cooperates with the at least one detent when the actuator is in the latch position to restrain the detent from moving from the active position.

20. A lock assembly according to claim 19 wherein the first portion of the inner surface is substantially annular and extends in a length direction which is substantially aligned with the axial direction the cam axis.

21. A lock assembly according to claim 20 wherein the inner surface includes a second portion extending from the first portion that is substantially frusto-conical defining a conical axis, said conical axis extending in the axial direction, the second portion cooperates with the at least one detent when the actuator is moving from the release position to the latching position to urge the at least one detent towards the active position.

22. A lock assembly according to claim 1 wherein the housing includes an aperture for each detent which extends from the space in a direction substantially perpendicular to the axial direction, each detent being movable within its aperture to move between the active position and the inactive position.

23. A lock assembly according to claim 22 wherein the detent is shaped relative to the size of the aperture so to protrude from the aperture when in the active or inactive positions respectively.

24. A lock assembly according to claim 22 wherein each detent substantially spherical and the aperture extends in a radial direction for a distance less than the diameter of the spherical detent.

25. A lock assembly according to claim 1 wherein the plug includes an attachment portion from which the shaft extends for attaching the plug to an object, wherein the actuator is configured to interact with the attachment portion that when in the locked position the plug is prevented from being detached from the object.

* * * * *